No. 679,363. Patented July 30, 1901.
I. CHURCH.
EXPANSION BOLT.
(Application filed Apr. 12, 1901.)
(No Model.)
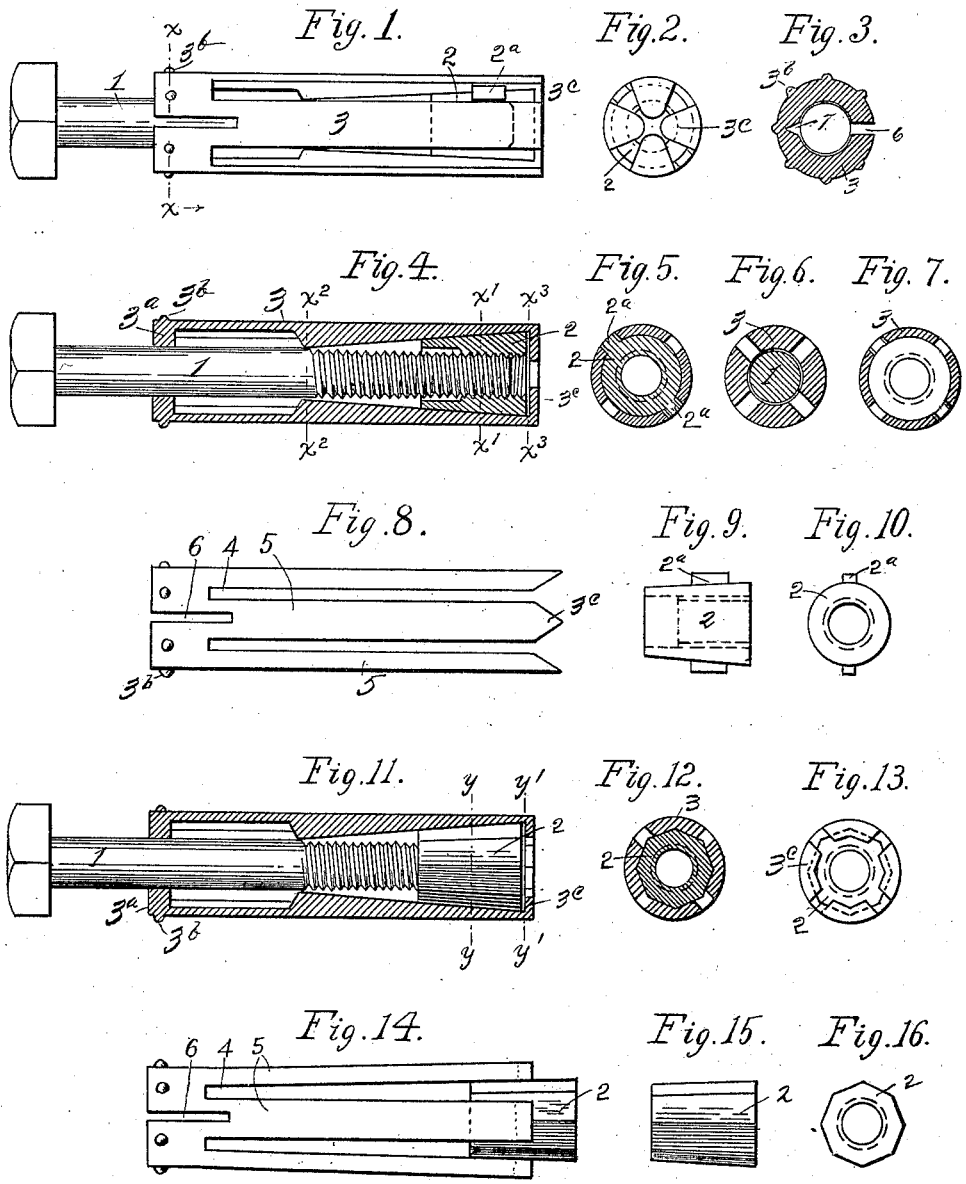

UNITED STATES PATENT OFFICE.

ISAAC CHURCH, OF TOLEDO, OHIO.

EXPANSION-BOLT.

SPECIFICATION forming part of Letters Patent No. 679,363, dated July 30, 1901.

Application filed April 12, 1901. Serial No. 55,449. (No model.)

*To all whom it may concern:*

Be it known that I, ISAAC CHURCH, a citizen of the United States, residing at Toledo, in the county of Lucas and State of Ohio, have invented certain new and useful Improvements in Expansion-Bolts; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to a threaded bolt having a split sleeve and carrying at its threaded extremity within the sleeve a nut, which by the turn of the bolt is moved longitudinally within the sleeve, thus expanding the sleeve and by this means securing the bolt, the nut, and the sleeve in any suitable cavity prepared to receive the same. In this class of devices a difficulty frequently encountered is that the nut, after the sleeve is driven into its socket, becomes slightly displaced and out of axial alinement with the sleeve and bolt. Now the bolt will either not enter the nut at all or will enter but slightly, becoming jammed. Under such circumstances it frequently becomes necessary by a slow and tedious process to dig the whole device from its socket. Another objection met with in many devices of this class is that the nut, which is of special form, becomes separated from its accompanying parts and is mislaid or lost, the whole device now becoming inoperative and worthless.

One object of my invention is to overcome the difficulties here indicated, and more particularly to provide a construction in which the nut is always held in axial alinement with its bolt and sleeve and in which the nut cannot become displaced or lost.

A further object of my invention is to furnish a sleeve of extreme flexibility which will conform to the walls of the socket in which it is used and to so arrange the sleeve and the nut that the nut cannot turn with the bolt, thus insuring the rapid and positive action of the nut and screw.

I attain these objects by means of the devices and arrangement of parts hereinafter described and shown, and illustrated in the accompanying drawings, in which—

Figure 1 is a side elevation of my device ready for operation; Fig. 2, an end view of the same seen from the right in Fig. 1; Fig. 3, a transverse sectional elevation of my device, taken on line $x\ x$, Fig. 1; Fig. 4, a central longitudinal sectional elevation of my device; Fig. 5, a transverse section taken on line $x^2\ x^2$, Fig. 4; Fig. 6, a transverse section taken on line $x'\ x'$, Fig. 4; Fig. 7, a transverse section taken on line $x^3\ x^3$, Fig. 4; Fig. 8, a side elevation of my sleeve, hereinafter referred to, detached and before the nut, hereinafter referred to, is secured in place; Fig. 9, a side elevation of the nut, hereinafter referred to, detached; Fig. 10, an end view of the same; Fig. 11, a longitudinal sectional elevation of a modified form of my device; Fig. 12, a transverse sectional elevation of the same, taken on line $y\ y$, Fig. 11; Fig. 13, an end elevation of the same seen from the right in Fig. 11; Fig. 14, a side elevation of said modified form, showing the sleeve and nut partly entered; Fig. 15, a side elevation of said nut detached, and Fig. 16 an end view of the same.

Like numerals of reference indicate like parts throughout the drawings.

In the drawings, 1 is a headed screw-threaded bolt, 2 a nut on said bolt, and 3 a cylindrical sleeve which incloses the nut and part of the bolt and is formed of some ductile metal, such as malleable iron. The sleeve is longitudinally slotted, as at 4, from near the end next the head of the bolt to its opposite end. These slots 4 are narrow and are arranged around the sleeve at equidistant intervals, forming a plurality of intermediate fingers 5, preferably three or four in number, for ordinary sized bolts. The inner wall of each of the fingers forms the segment of a circle and is tapered toward its outer extremity. (See Figs. 4 and 11.) The sleeve 3 at its end next the head of the bolt is provided with a head $3^a$, through which is an axial opening just large enough to receive the bolt. At one side of the sleeve the head and wall of the sleeve are slotted for a short distance toward the opposite end, as at 6. Opposite the slot 6 in the interior wall of the sleeve is a deep channel or groove 7. (See Fig. 3.) The sleeve at its head is provided with a number of radial projections or points $3^b$.

The nut 2 is conical or tapered to correspond with the bevel of the inner walls of the fingers. This nut may be either circular or angular in transverse section, as may be desired. In case the nut employed is circular in transverse section the nut has radially-projecting lugs 2ª, which enter and engage the walls of the slots 4; but should the nut be polygonal in transverse section the lugs 2ª will be unnecessary, for the angles of the nut will rest in the spaces between the walls 4, and the inner faces of the fingers 5 may be formed, as illustrated in Fig. 12, to coincide with the transverse contour of the nut.

My device is assembled by slipping the nut into the larger open end of the sleeve, which is shown detached in Fig. 8. The bolt is slipped into the sleeve from the opposite end and screwed into the nut a short distance. Now the ends of the fingers which project beyond the nut are by means of a suitable implement or machine bent inwardly at a right angle toward each other, as at 3ᶜ. The nut is now confined within the sleeve, so that it cannot be lost, and as the nut is thus secured while the bolt is in place the alinement of the sleeve or bolt and the nut must necessarily be accurate, so that the bolt will now always enter the nut without difficulty.

The operation of my device is as follows: For illustration, a plank is to be secured to a brick wall. A hole just large enough to receive the sleeve is bored in the wall and the sleeve, with the nut, secured in place as above described, is driven into the hole its full length. The bolt is now passed through a hole in the plank and into the sleeve and nut. By turning the bolt the nut, which is held against rotation, as above described, is powerfully drawn toward the head of the bolt, the inclined surfaces of the bolt and of the fingers being in contact. Now by the wedge-like action of the nut the fingers are spread apart and into close engagement with the wall of the hole, thus preventing the sleeve from being pulled from its socket. The deep channel or groove 7 at the outer end of the sleeve, together with the slot 6 in the opposite side of the sleeve, permits the sleeve to be by the wedge-like action of the tapered nut spread outwardly, and the points 3ᵇ and the outer wall of the head of the sleeve are also brought into close and powerful contact with the wall of the hole or socket.

Having described my invention, what I claim, and desire to secure by Letters Patent, is—

1. An expansion-bolt comprising a threaded bolt, a tapered nut thereon, a sleeve inclosing the nut and longitudinal extensions on said sleeve adapted to be bent inwardly behind the nut to prevent its displacement.

2. In an expansion-bolt, a threaded bolt, a tapered nut on the bolt, a sleeve for the bolt and nut, longitudinal separated portions in said sleeve which form fingers, and inwardly-turned portions at the extremities of said fingers which overlap the nut and which prevent the displacement of the nut.

3. In an expansion-bolt, a sleeve, a threaded bolt and nut, the sleeve and nut having correspondingly-tapered opposing walls, means for preventing the axial rotation of the nut, and inwardly-turned portions of the sleeve at its end to prevent the displacement of the nut.

4. In an expansion-bolt, a sleeve, longitudinally-separated portions at one end of said sleeve forming fingers, extensions on said fingers adapted to be bent inwardly, a longitudinal weakened portion at the opposite end of the sleeve formed by a deep channel or groove, and a slotted portion in said sleeve opposite said deep channel or groove.

5. In an expansion-bolt, a sleeve, longitudinally-separated portions at one end of said sleeve forming fingers, extensions on said fingers adapted to be bent inwardly, a longitudinal weakened portion at the opposite end of the sleeve formed by a deep channel or groove, a slotted portion in said sleeve opposite said deep channel or groove, and radial points 3ᵇ on said sleeve near its outer end.

In testimony whereof I affix my signature in presence of two witnesses.

ISAAC CHURCH.

Witnesses:
CHAS. E. CHITTENDEN,
L. E. BROWN.